Nov. 28, 1961  H. T. JOHNSON  3,010,616
MACHINE FOR DISPENSING MEASURED QUANTITIES
OF LIQUID COLOR CONCENTRATES
Filed March 16, 1959  4 Sheets-Sheet 1
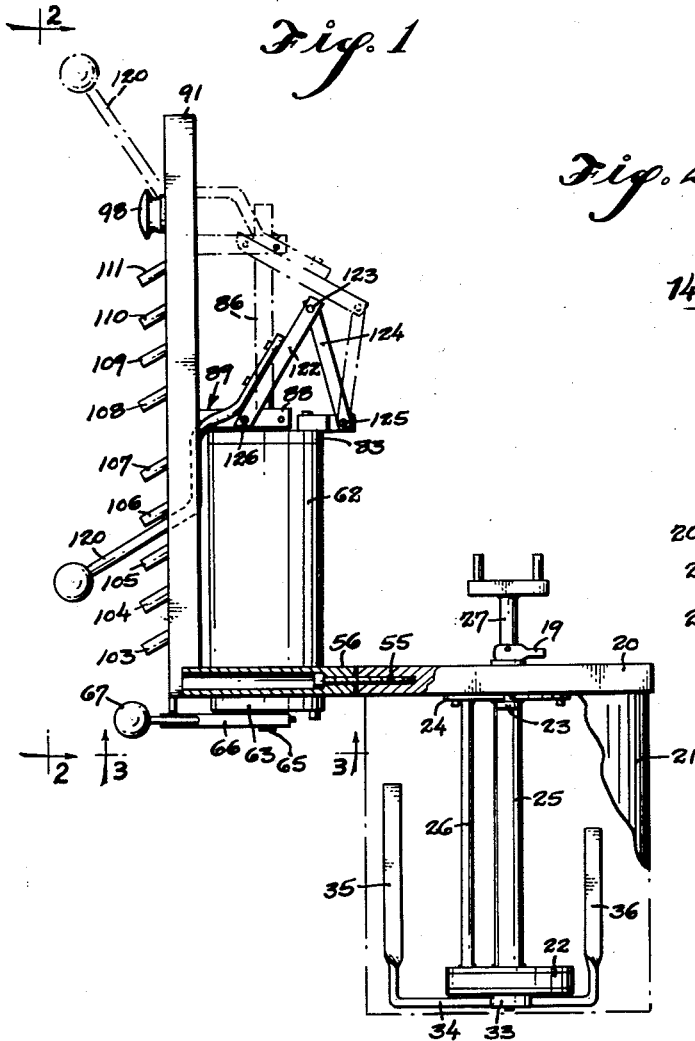
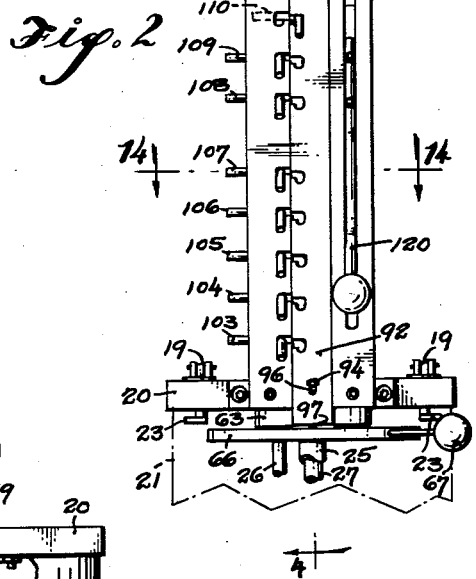
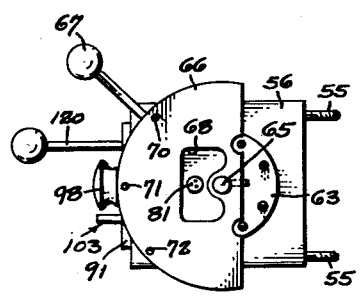
INVENTOR.
HAROLD T. JOHNSON
BY
Barnes & Seed
ATTORNEYS Nov. 28, 1961  H. T. JOHNSON  3,010,616
MACHINE FOR DISPENSING MEASURED QUANTITIES
OF LIQUID COLOR CONCENTRATES
Filed March 16, 1959  4 Sheets-Sheet 2
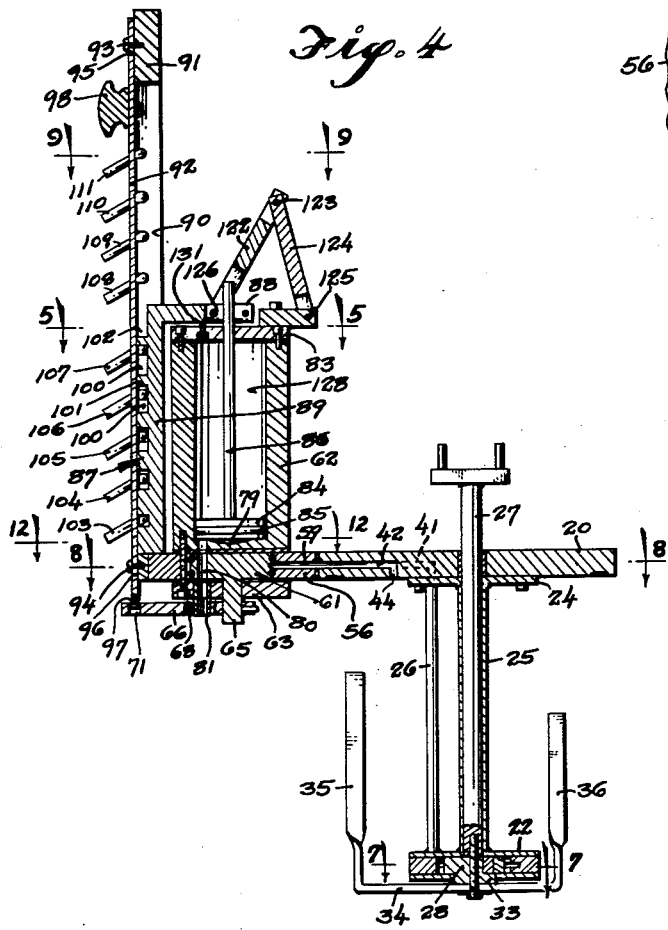
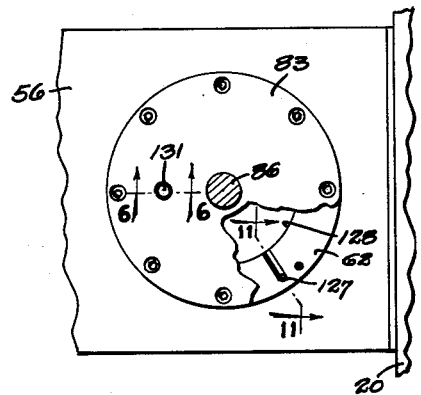
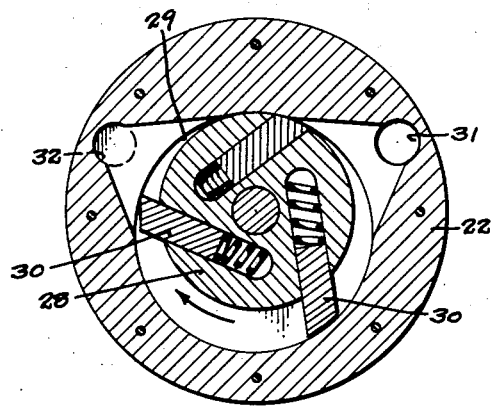
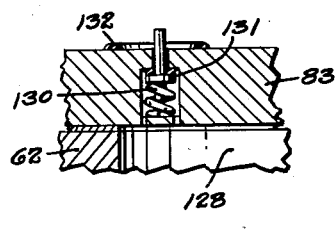
INVENTOR.
HAROLD T. JOHNSON
ATTORNEYS Nov. 28, 1961  H. T. JOHNSON  3,010,616
MACHINE FOR DISPENSING MEASURED QUANTITIES
OF LIQUID COLOR CONCENTRATES
Filed March 16, 1959  4 Sheets-Sheet 3
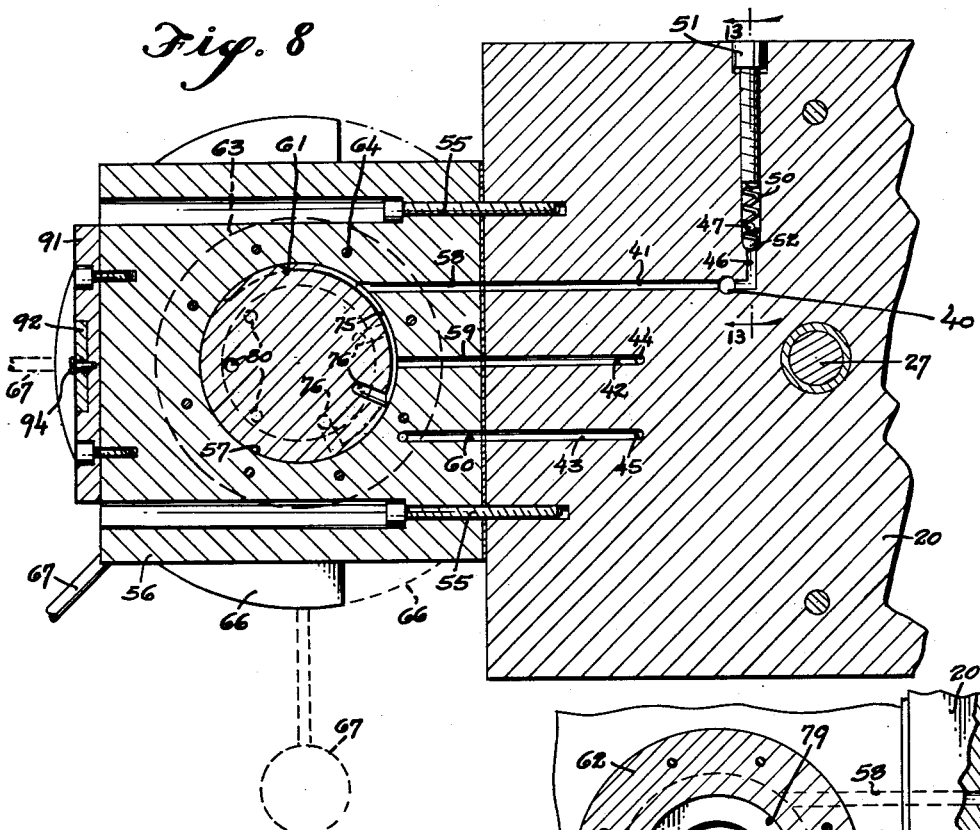
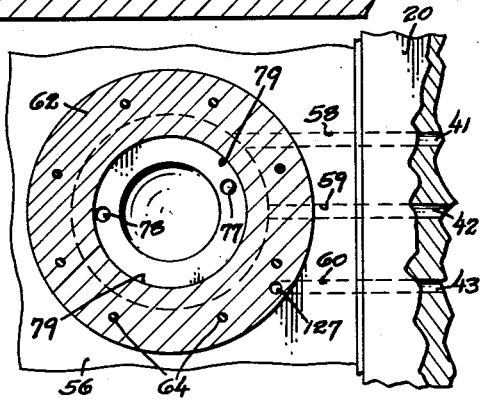
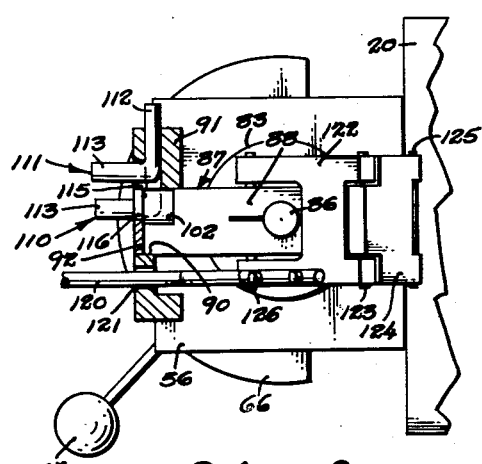
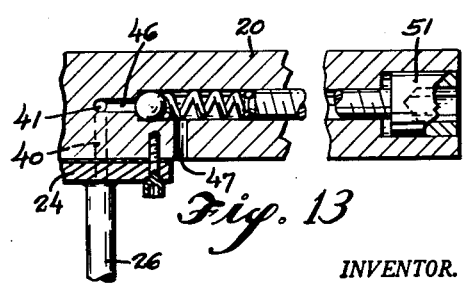
INVENTOR.
HAROLD T. JOHNSON
ATTORNEYS

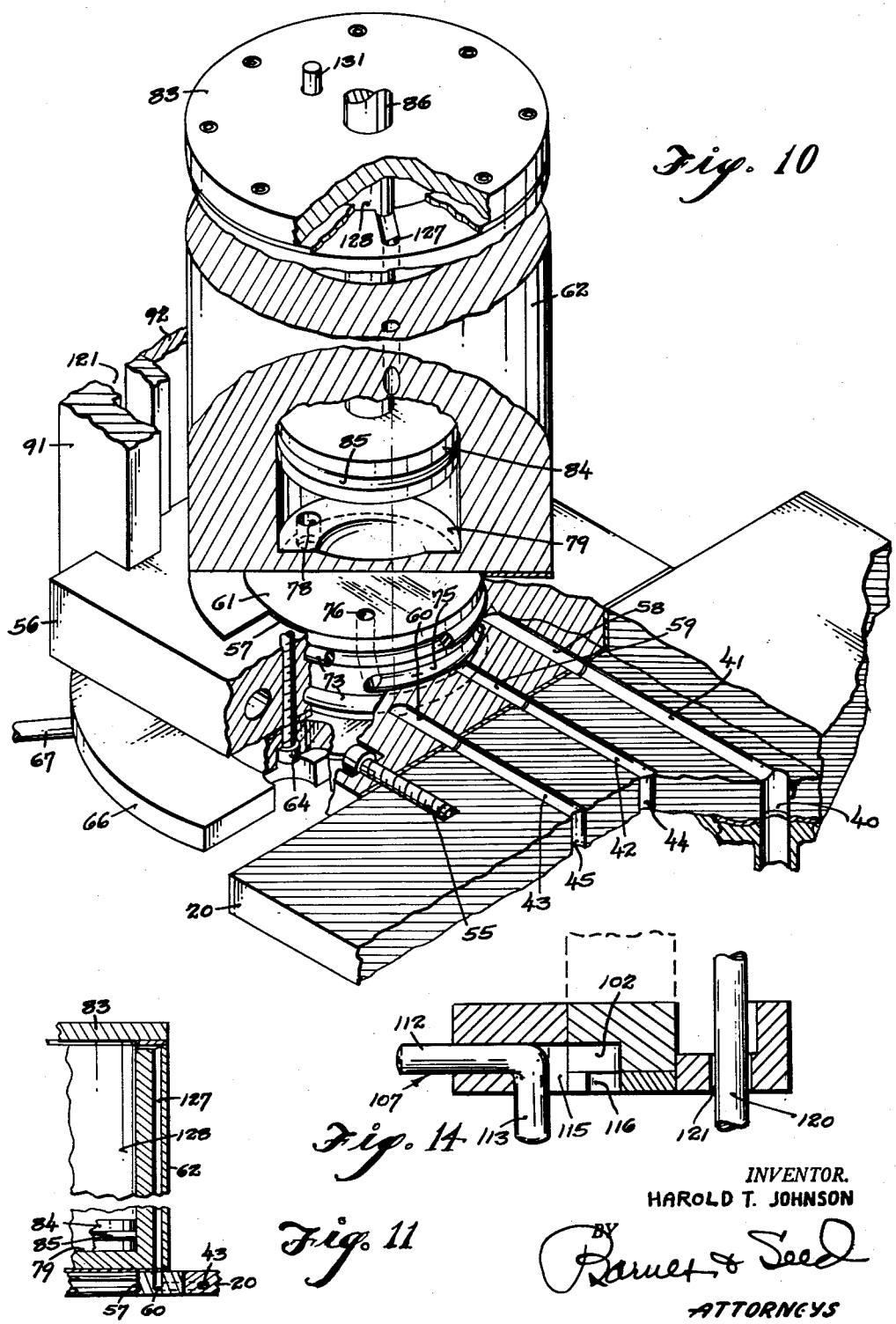

United States Patent Office 3,010,616
Patented Nov. 28, 1961

3,010,616
MACHINE FOR DISPENSING MEASURED QUAN-
TITIES OF LIQUID COLOR CONCENTRATES
Harold T. Johnson, 9010 W. Shorewood,
Mercer Island, Wash.
Filed Mar. 16, 1959, Ser. No. 799,544
12 Claims. (Cl. 222—309)

This invention relates to a machine for dispensing measured quantities of fluid coloring concentrate, and for its general object aims to provide a precision machine for this and analagous purposes which is comparatively simple and inexpensive in construction and which is sufficiently easy to use and understand that the public can operate the same with little or no difficulty. It is a further and particular object to provide a machine characterized in that any selected measure of a quantity to be dispensed can be erased at will should an error be made.

These and other objects and advantages of the invention will appear and be understood in the course of the following description and claims, the invention consisting in the novel construction and in the adaptation and combination of parts hereinafter described and claimed.

In the accompanying drawings:

FIG. 1 is a fragmentary view in side elevation, with parts in section, illustrating a machine constructed to embody preferred teachings of the present invention.

FIG. 2 is a fragmentary front elevational view thereof.

FIG. 3 is an underside plan view of a front portion of the machine.

FIG. 4 is a longitudinal vertical sectional view on the line 4—4 of FIG. 2.

FIG. 5 is a fragmentary horizontal sectional view on line 5—5 of FIG. 4.

FIG. 6 is a detail fragmentary longitudinal vertical sectional view drawn to an enlarged scale on line 6—6 of FIG. 5.

FIG. 7 is a horizontal sectional view drawn to an enlarged scale on line 7—7 of FIG. 4.

FIG. 8 is a fragmentary horizontal sectional view drawn to an enlarged scale on line 8—8 of FIG. 4.

FIG. 9 is an enlarged-scale fragmentary horizontal sectional view on line 9—9 of FIG. 4.

FIG. 10 is a fragmentary perspective view with parts broken away and in section to illustrate the mounting plate, control valve and piston-cylinder assemblies incorporated in the invention.

FIG. 11 is a fragmentary vertical sectional view on line 11—11 of FIG. 5.

FIG. 12 is a fragmentary horizontal sectional view drawn to the same scale as FIG. 8 on line 12—12 of FIG. 4.

FIG. 13 is a fragmentary transverse vertical sectional view on line 13—13 of FIG. 8; and FIG. 14 is an enlarged-scale fragmentary horizontal sectional view on line 14—14 of FIG. 2.

Referring to said drawings, there is provided as a foundation mounting a plate designated by the numeral 20. This plate is adapted to be secured in surmounting relation upon an open-top gallon can 21 containing a liquid color concentrate for paints, being attached thereto in any suitable manner as, for example, by the dogs 19 located at diametrically opposite sides of a given vertical axis and each eccentrically mounted upon the exposed upper end of a respective rotatively mounted vertical pin which extends through the plate and presents a clamping foot 23 upon the exposed lower end. The two clamping feet are arranged to be detachably lodged under the circumferential lip common to commercial paint cans by the act of swinging the feet about the center of the parent pin as an axis and then activating the dogs so as to forcefully lift the feet and clamp the lip tightly to the underside of the mounting plate. The can may be separately anchored so that the mounting plate relies upon the can for its support or the plate may be anchored to a support and the can hung from the plate. The latter arrangement is preferred.

The plate has a disc 24 secured by cap screws to its underside, and this disc presents two integral hollow stems 25 and 26 which are offset from one another and depend into the can 21. The two stems are both attached at their lower ends to the casing 22 for a rotary pump and thus give support thereto. Stem 25 is located on the given axis hereinbefore referred to. Its hollow center registers at the top with a bore drilled through the mounting plate, and at the bottom with an opening in the top wall of the pump casing.

A drive shaft 27 extends through said hollow center of the stem 25 and the registering bores of the plate and the pump casing, protruding by its upper end above said plate, and having its lower end fixedly attached to a pump rotor 28 working in the cylindrical chamber 29 of the pump. Said protruding upper end is driven in any suitable manner by an electric motor (not shown). Spring-pressed vanes 30 work in suitable pockets of the rotor so as, by rotation of the rotor, to draw liquid from the bottom of the can through an induction port 31 into the pump chamber 29 and expel the same through an eduction port 32 which feeds to the hollow center of the other stem 26. The rotor has a depending bearing hub 33 which fits an opening in the bottom wall of the pump casing. A protruding portion of this hub is diametrically slotted. A U-shaped agitator has its cross member 34 secured in this slot so as to be driven in concert with the rotation of the rotor. Each upstanding arm of the agitator is twisted within its length to produce a paddle, as 35 and 36, each having its greatest width located on a common diameter of the drive shaft 27. One paddle is spaced from the rotary axis a greater distance than the other.

Stem 26, carrying the eduction flow of the fluid coloring agent being pumped by the pumping vanes, communicates by its upper end with a passage 40 drilled vertically from the underside of the mounting plate 20 so as to connect with a horizontal passage 41 drilled inwardly from the edge of the plate which faces toward the front. There are two other passages 42 and 43 extending horizontally inwardly from said front edge, separated one from another and from the passage 41, and both passages communciate with the interior of the attached can 21 by connecting vertical passages, as 44 and 45. The passage 41 extends inwardly beyond said connecting passage 40 and there connects with a horizontal passage 46 drilled from a side face of the mounting plate. A vertical passage 47 leads from said passage 46 to the interior of the attached can. A valve seat is provided at a point intermediate the junctures of said passages 47 and 46 and the passages 46 and 41. A spring 50 having its pressure regulated by a plug 51 yieldingly presses a ball relief valve 52 against said seat so as normally to isolate the passage 47 from the passage 41.

A plate extension 56 is rigidly secured by bolts 55 to the mounting plate so as to occupy a co-planar position to the front of the mounting plate. This plate extension presents a cylindrical valve cavity or chest 57 which is open to the top and bottom. Three passages, as 58, 59 and 60, are drilled in the plate extension. Passage 58 connects at one end with the passage 41 and at the other end communicates with a cylinder port on a level midway between two vertically spaced grooves which extend circumferentially about the cylinder. Passage 59 also communicates at one end with a port in the side wall of the cylinder located midway between the grooves and at its other end connects with the passage 42. Said two passages 58 and 59 lie moderately close to one another. The third passage 60 connects at one end with the passage 43 and has its other end exposed to the upper face of the plate extension 56.

A rotary valve 61 is received for rotary movement in the chest 57, being retained therein by top and bottom headers 62 and 63, respectively, secured in place by bolts 64. The bottom header has a center-bore, and a stem prolongation 65 of the valve extends through this bore and has a protruding lower end thereof fixed to a sectoral control disc 66 manually turned by means of a radial handle 67. Stops are provided to limit the rotary motion of the disc to an approximate quarter turn. For a purpose which will hereinafter be described, said control disc has a quadrantal cut-out 68 therein (see FIG. 3) and has a series of three vertical positioning holes 70, 71 and 72 circumferentially spaced from one another on a common arc of the disc lying adjacent the perimeter of the latter, the total span of these three holes approximating 90°.

Valve 61 is grooved circumferentially in registering correspondence with the grooving of the wall of the chest. A pair of O-rings 73 are received in these registering grooves. Between such O-rings a surface groove 75 is formed in the periphery of the valve. Groove 75 extends only about a portion of the circumference of the valve with its placement and length such that it will at all times lap the port which connects passage 58 with the valve chest, and also laps the port which connects passage 59 with the chest excepting when the valve is in a charging position, occurring at one extreme of its 90° turning motion. A passage 76 is cored in the valve so as to lead from one end of the groove 75 to the upper face of the valve, being there adapted to be brought into and out of registration with one, designated by 77, of two vertical passages extending within the header 62 between the bottom face thereof and the floor of a cylinder 79 formed in the header. The other passage 78 is likewise placed so as to be brought into and out of registration with a vertical passage 80 drilled through the valve. Such latter passage leads to a perforated downwardly directed discharge nozzle 81 exposed in said cut-out 68, and is so placed that it registers with the passage 78 when the control disc is moved to a point approximately mid-way between its two extremes of turning motion. More especially, this registration occurs when the center positioning hole 71 of the control disc is moved to an intermediate position coinciding with a vertical plane common to the axes of the valve 61 and the drive shaft 27.

Said cylinder 79 is closed at the top by a header 83. A piston 84 is received for endwise movement within the cylinder and carries an O-ring 85 to create an effective seal. The piston is moved within the cylinder by a rod 86 which protrudes by its upper end above the header 83. A cross-head 87 having an angular shape when viewed from the side has one leg 88 overlying the header and clamped to the exposed end of the piston rod. The other leg 89 lies to the front of the cylinder 79 and receives a slide fit in a vertical slot 90 provided by a post 91 rigidly surmounting the plate extension 56 at the front end of the latter. A latching bar 92 is also guidably received within this slot, lying to the front of the leg 89, but whereas the leg 89 of the cross-head admits to a fairly extended vertical travel the latch has only a very limited motion prescribed by two fixed pins 93 and 94 which are received through vertical slots 95 and 96 respectively, provided in the latch at the top and bottom ends thereof. The function of this latch is to releasably lock the control disc 66 in any one of three rotary positions, providing for this purpose a depending pin 97 which is lodged, selectively, in any one of the three holes 70, 71 or 72 of the disc. A knob 98 permits the latch to be lifted by hand so that the pin will be withdrawn from a selected said hole, and such latch is also elevated automatically, in a manner hereinafter to be described, in consequence of charging from the can 21 into the cylinder 78 a selected volume of coloring fluid.

Reverting to the cross-head 87 which controls the piston so that the latter will meter selective volumes of fluid coloring, a set of vertically spaced cheek pockets are provided therein, separated one from another by abutments 101. The uppermost of these pockets is open at the top and is designated by 102. The other pockets are designated by 100. As I have here elected to show and as can be best seen from an inspection of FIG. 4 there are five of the pockets 100.

As complements of the cheek pockets 100 and 102 the post 91 provides respective horizontal rotary and slide journals for one leg 112 of each of a plurality of elbow-shaped set pins. There is a respective one of said pins, as 103, 104, 105, 106 and 107, for each of the pockets 100 and there are four of said pins, designated by 108, 109, 110 and 111, lying in vertically spaced apart positions above the open-top cheek pocket 102. The other legs 113 of said elbow-shaped set pins lie at the inside end of the legs 112 and extend forwardly therefrom. By the slide motion of legs 112, legs 113 are movable reciprocally in a lateral direction into and out of a related one of the several cheek pockets 100 and 102. These legs 113 have their free ends exposed to the front of the post for manual operation, and have a root portion thereof normally lodged in a respective cheek pocket 115 formed in the post.

The vertical dimension of the pockets 100 progressively increases. The several set pins are each drawn from rod stock of circular cross-section having a diameter somewhat smaller than the vertical span of the lowermost of said pockets 100, and the set pins 103 through 107 are so placed that they each register with the uppermost portion of a related said pocket 100 when the cross-head occupies its lowermost position. From the foregoing it perforce follows that upon shifting a selected one of the set pins 103, 104, 105, 106 or 107 from its post pocket 115 into the related pocket 100 of the cross-head the cross-head may then be raised only in the degree to which the vertical span of the concerned pocket 100 exceeds the diameter of the set pin. Should a selected one of the upper four pins 108, 109, 110 or 111 be shifted laterally into an interruptive position in the travel path of the cross-head, such cross-head then admits of being raised in accordance with the spacing between said selected pin and the floor of the cheek pocket 102. The exact mathematics of said several spacings, proportioning the permitted vertical travel of the cross-head to the circumference of the cylinder 79, need not be here described in particular detail. Suffice it to say that the travel of the cross-head permitted by pins 103 through 111 is or may be such that the piston 84 measures, in the respective instance, $\frac{1}{32}$ ounce, $\frac{1}{12}$ ounce, $\frac{1}{8}$ ounce, $\frac{1}{4}$ ounce, $\frac{1}{2}$ ounce, 1 ounce, 2 ounces, 3 ounces, and 4 ounces of fluid coloring.

In addition to the cheek pockets which are provided in the cross-head 87 there are provided along the edge of the latch 92 a series of notches 116 each having a vertical dimension corresponding to the diameter of the set pins and so placed that one such slot registers with a respective one of the post pockets 115 when the latch occupies the upper extreme of its limited vertical reciprocal motion. The post pockets 115 and the latch notches 116 each have a slight indentation at the inner end into which the forwardly extending leg 113 of a shifted pin is adapted to lodge so as to resist accidental motion of the pins endwise to the axis of the legs 112.

In order to shift a selected set pin laterally from the pocket of the post in which it is normally lodged, preparatory to charging the cylinder 79, it is necessary that the latch be manually raised in order that slots 116 will register with the post pockets 115. In this raised position the locking pin 97 clears the holes of the control disc 66 and allows the latter to be turned to the charging position, whereupon pin 97 will drop into hole 70. The pump thereupon forces fluid coloring into the cylinder. The cross-head 87, moving in concert with the rise of the metering piston, rises until its travel is interrupted by engagement with the selected set pin. This engagement automatically lifts the actuating leg 113 of said pin from its normal downwardly sloping condition into a horizontal position which responsively lifts the latch to withdraw the locking pin from said hole 70. The control disc 66 is now manually turned, being moved in a counter-clockwise direction as viewed from above, and the locking pin drops by gravity into hole 71 as it is brought into register therewith. The metered fluid coloring may now be discharged through the perforated nozzle 81 by forcing the piston downwardly in cylinder 79. This is done manually by means of an arm 120 which is received in a vertical slot 121 formed in the post 91. The arm is fixed by its inner end to a yoke 122 straddling the horizontal leg 88 of the cross-head 87 and with the yoke produces a second-order lever attached by a floating fulcrum 123 to a link 124 pivoted at 125 to the head end of the cylinder. The arms of the yoke are attached to the leg 88 by a traversing pivot pin 126.

It is desirable that the fluid coloring within the can 21 be protected against oxidizing, as would occur were the interior of the can to be exposed to the atmosphere. It is necessary, however, that the interior of the can be held at atmospheric pressure. For this purpose I provide in the wall of the block 62 a passage 127 connecting with passage 60 and leading from the chamber 128 which lies above the piston 84. Passage 60, as previously described, connects with passage 43 so that constant communication obtains between said chamber 128 and the interior of the can. Said upper chamber, while normally isolated from the atmosphere, has a valved connection therewith momentarily opened against the yielding pressure of a spring 130 as the leg 88 of the cross-head approaches the low extreme of its vertical motion. The valve is denoted by 131. The air-access opening through which a depressible stem of the valve loosely extends is surrounded by a ring 132 (see FIG. 6) of felt, rubber or other sealing material against which the leg 88 presses at the low extreme of its travel.

The invention and the manner of its operation will, it is believed, have been clearly understood from the foregoing detailed description of my now-preferred illustrated embodiment. Assume that the valve 61 has been turned by control disc 66 in a clockwise direction to one extreme of its permitted rotary travel the passage 80 is then out of register with passage 78 and passage 76 is in register with passage 77. Pumped fluid coloring is consequently fed by passages 40—41—58 to the valve groove and thence by said connecting passages 76 and 77 into the measuring cylinder, the piston rising to the predetermined level prescribed by the selected set pin 103, 104, 105, 106, 107, 108, 109, 110 or 111, as the case may be. Upon now turning the valve to the intermediate position in which it is shown in FIG. 8, passage 76 is moved out of register with passage 77, isolating the cylinder from the pumped column of fluid coloring, and passage 80 is brought into register with passage 78 whereupon the measured body of fluid coloring within the cylinder may be dispensed into a receiving receptacle, placed under the non-drip discharge nozzle 81, by pressing downwardly upon the lever arm 120. By swinging the control disc in a counter-clockwise direction to the opposite extreme of its permitted turning motion both the passage 76 and the passage 80 are isolated from passages 77 and 78, respectively, this being the inoperative position of the valve. Excepting when the control valve is in charging position, the series of out-go passages 40—41—58 and the series of return passages 59—42—44 are connected at all times by the valve groove 75.

During such charging position groove 75 is moved to a position isolated from channel 59 and the liquid coloring charged into the measuring cylinder is thus under a high pressure determined by the spring setting of the relief valve 52, which acts at this time to return the excess of pumped liquid back to the reservoir 21. It will consequently be apparent that the pump may continuously operate.

Changes in details of construction may be resorted to without departing from the spirit of the invention and it is accordingly my intention that no limitations be implied and that the hereto annexed claims be given a scope fully commensurate with the broadest interpretation to which the employed language fairly admits.

What I claim, is:

1. A machine for dispensing measured quantities of liquid concentrate from a reservoir therefor comprising, in combination with the reservoir: a valve chest, a pump having its induction side exposed to the liquid within said reservoir, a passage connecting the eduction side of the pump with a first port in the wall of the valve chest, a passage connecting the reservoir with a second port in the wall of said chest, a cylinder, a piston slidably received in said cylinder, a rod fast to the piston and having an exposed end projecting through one end wall of the cylinder, means connected with said exposed end of the rod for setting the piston at selected points within the cylinder so as to predeterminedly vary the volumetric capacity of the chamber formed between said piston and the other end wall of the cylinder, two separated passages one connecting the chamber with a third and the other with a fourth wall port of the valve chest, a passage leading from a fifth port of the valve chest to a dispensing nozzle, a control valve received in said chest for movement into any one of three positions, selectively, and characterized in that means are provided therein by which the first and second port are in constant communication, each of said other ports are isolated one from another and from said first and second ports in one of said three positions of the valve, the first and third ports are brought into communication in a second position of the valve, and the fourth and fifth ports are brought into communication in the third position of the valve, and means operable when the valve occupies said third position for moving the piston so as to expel from said chamber the liquid concentrate charged thereto when the valve occupied said second position.

2. A machine for dispensing measured quantities of liquid concentrate from a reservoir therefor comprising, in combination with the reservoir: a valve chest, a pump having its induction side exposed to the liquid within said reservoir, a passage connecting the eduction side of the pump with a first port in the wall of the valve chest and having constant communication with a return passage leading to the reservoir, a cylinder, a piston slidably received in said cylinder, a rod fast to the piston and having an exposed end projecting through one end wall of the cylinder, means connected with said exposed end of the rod for setting the piston at selected points within the cylinder so as to predeterminedly vary the volumetric capacity of the chamber formed between said piston and the other end wall of the cylinder, two separated passages one connecting the chamber with a second and the other with a third wall port of the valve chest, a passage leading from a fourth port of the valve chest to a dispensing nozzle, a control valve received in said chest for movement into any one of three positions, selectively, and characterized in that passages are provided therein so positioned that the first and second ports are brought into communication in one of said three positions of the valve, the third and fourth ports are brought into communication in a second position of the valve, and all of the ports are isolated from one another in the third position of the valve, and means adapted to be operated when the valve occupies said second position for moving the piston so as to expel from the chamber the charge of liquid concentrate supplied thereto when the valve occupied said first position.

3. Structure as recited in claim 2 in which the means last recited comprises a manually operated second-order lever fulcrumed to the free end of a link pivotally attached to the head end of the cylinder, said lever including a yoke having its arms straddling said projecting end of the piston rod and attached by a traversing pivot pin thereto.

4. Structure according to claim 2 in which the reservoir is normally isolated from the atmosphere, means being provided operated automatically in response to each dispensing operation for exposing said reservoir to the atmosphere for a momentary interval.

5. Structure according to claim 4 in which the automatically operated means comprises a valve opened momentarily in response to said dispensing operation and normally closing an opening from the atmosphere to a chamber which is formed in the end of the cylinder opposite that in which the charge is received, the said chamber being in constant communication with the reservoir.

6. A machine for dispensing measured quantities of liquid concentrate comprising, in combination: an open-top can serving as a source of supply for the concentrate, a mounting plate providing means for detachably securing the can to the underside thereof so that the plate will serve as an air-tight closure for the open top of the can, a valve chest formed in said plate, a rotary pump received in the can with its induction side exposed to the liquid within the latter, a pair of laterally spaced apart vertically disposed hollow stems having their lower ends rigid with the casing for the pump and attached by their upper ends to the plate so as to fixedly suspend the pump from the plate, a drive shaft for the rotor of the pump received through the hollow center of one of said stems and powered from above the plate, the other of said hollow stems leading from the eduction side of the pump and thence connecting by a passage within the plate with a first port in the wall of the valve chest, a return passage in said plate providing constant communication between said port and the interior of the can, a cylinder block surmounting said plate, a piston slidably received in a vertical cylinder formed in said block, a rod fast to the piston and having an exposed end projecting through the top wall of the cylinder, adjustable means operatively interconnected with said exposed end of the rod to serve as a stop therefor and responsively establish a selected height setting to which the piston may rise within the cylinder under pressure of liquid fed from the pump, so as to predeterminedly vary the volumetric capacity of the chamber formed between the piston and the bottom wall of the cylinder, two separated passages one connecting the chamber with a second and the other with a third wall port of the valve chest, a passage leading from a fourth port of the valve chest to a dispensing nozzle, a control valve received in said chest for movement into any one of three positions, selectively, and characterized in that passages are provided therein so positioned that the first and second ports are brought into communication in one of said three positions of the valve, the third and fourth ports are brought into communication in a second position of the valve, and all of the ports are isolated from one another in the third position of the valve, and means adapted to be operated when the valve occupies said second position for moving the piston so as to expel from the chamber the charge of liquid concentrate supplied thereto when the valve occupied said first position.

7. The machine of claim 6 in which the rotor of the pump has a diametrically slotted hub section projecting below the pump casing, and a U-shaped agitator having its cross-bar fixed in said slot so as to turn in unison with the rotor and having the two side arms extending upwardly as agitating paddles at opposite sides of the pump.

8. Structure according to claim 6 in which the valve is a rotary member turning about a vertical axis and with the cylindrical chest therefor being placed so as to directly underlie the bottom wall of the cylinder block.

9. A machine for dispensing measured quantities of liquid concentrate comprising, in combination: an open-top can serving as a source of supply for the concentrate, a mounting plate providing means for detachably securing the can to the underside thereof so that the plate will serve as an air-tight closure for the open top of the can, a valve chest formed in said plate, a rotary pump received in the can with its induction side exposed to the liquid within the latter, a pair of laterally spaced apart vertically disposed hollow stems having their lower ends rigid with the casing for the pump and attached by their upper ends to the plate so as to fixedly suspend the pump from the plate, a drive shaft for the rotor of the pump received through the hollow center of one of said stems and powered from above the plate, the other of said hollow stems leading from the eduction side of the pump and thence connecting by a passage within the plate with a first port in the wall of the valve chest, a return passage in said plate providing constant communication between said port and the interior of the can, a cylinder block surmounting said plate, a piston slidably received in a vertical cylinder formed in said block, a rod fast to the piston and having an exposed end projecting through the top wall of the cylinder, adjustable means operatively interconnected with said exposed end of the rod to serve as a stop therefor and responsively establish a selected height setting to which the piston may rise within the cylinder under pressure of liquid fed from the pump, so as to predeterminedly vary the volumetric capacity of the chamber formed between the piston and the bottom wall of the cylinder, two separated passages one connecting the chamber with a second and the other with a third wall port of the valve chest, a passage leading from a fourth port of the valve chest to a dispensing nozzle, a control valve received in said chest for movement into any one of three positions, selectively, and characterized in that passages are provided therein so positioned that the first and second ports are brought into communication in one of said three positions of the valve, the third and fourth ports are brought into communication in a second position of the valve, and all of the ports are isolated from one another in the third position of the valve, and means adapted to be operated when the valve occupies said second position for moving the piston so as to expel from the chamber the charge of liquid concentrate supplied thereto when the valve occupied said first position, said valve being a rotary member turning about a vertical axis and with the cylindrical chest therefor being placed so as to directly underlie the bottom wall of the cylinder block, latch means being provided for releasably locking the valve in any of its three control positions, selectively.

10. Structure according to claim 9, the means for establishing said height setting for the piston travle comprising a cross-head guided for reciprocal vertical movement in a slide-way located alongside the cylinder block and operatively interconnected with the piston so as to move in concert therewith, and a series of independently activated pins journaled in a side wall of said slide-way for horizontal slide movement into and out of an interruptive position in the slide path travelled by the cross-head and spaced one from another at progressively greater intervals from the bottom to the top of said slide path.

11. Structure according to claim 10, and means operatively associating the cross-head with the latch causing the latter to be moved into a position inactive to the valve automatically in response to interruption by a selected said pin with the slide travel of the cross-head.

12. Structure according to claim 9, the means for establishing the height to which the piston may rise within the cylinder comprising a cross-head guided for reciprocal vertical movement in a slide-way located alongside the cylinder block and operatively interconnected with the piston so as to move in concert therewith, said cross-head having a series of vertically spaced cheek pockets provided along a side edge of the cross-head with the vertical dimension thereof progressively increasing from the bottom to the top, and a respective pin for each of said pockets journaled in a side wall of said slide-way for horizontal slide movement of a tip portion thereof into and out of a related said pocket, the pins being drawn from rod stock of a diameter less than the height of the lowermost pocket and being so placed that the same register with the uppermost portion of a related said pocket when the cross-head is at the bottom limit of its slide travel.

References Cited in the file of this patent

UNITED STATES PATENTS

| | | |
|---|---|---|
| 2,651,439 | Stevenson | Sept. 8, 1953 |
| 2,768,581 | Langemack | Oct. 30, 1956 |
| 2,885,119 | Carriol | May 5, 1959 |